United States Patent [19]
Stevenson

[11] Patent Number: 5,378,207
[45] Date of Patent: Jan. 3, 1995

[54] TRANSMISSION CONTROL VALVE SYSTEM

[75] Inventor: Paul D. Stevenson, Ann Arbor, Mich.

[73] Assignee: General Motors Corporation, Detroit, Mich.

[21] Appl. No.: 37,214

[22] Filed: Mar. 26, 1993

[51] Int. Cl.$^6$ .............................................. F16H 59/02
[52] U.S. Cl. ..................................... 475/135; 475/123; 137/625.23; 137/625.24
[58] Field of Search ............... 475/131, 132, 134, 135, 475/122, 123; 137/625.23, 625.24; 91/536

[56] References Cited

U.S. PATENT DOCUMENTS

| | | | |
|---|---|---|---|
| 1,619,701 | 3/1927 | Chorlton | 475/135 |
| 1,997,057 | 4/1935 | Hamilton, Jr. | 475/135 |
| 2,101,239 | 12/1937 | Chilton | 475/135 |
| 2,158,054 | 5/1939 | Bradbury | 475/135 |
| 2,179,082 | 11/1939 | Benson | 475/135 |
| 3,101,012 | 8/1963 | Christenson et al. | 475/135 |
| 3,578,007 | 5/1971 | Blake | 475/122 |
| 4,285,366 | 8/1981 | Elser | 137/625.23 |
| 4,326,433 | 4/1982 | Black et al. | 475/132 |
| 4,538,640 | 9/1985 | Acker | 91/536 |
| 4,603,603 | 8/1986 | Salmon | 74/868 |
| 4,705,129 | 11/1987 | Fassbender | 137/625.24 |

*Primary Examiner*—John T. Kwon
*Attorney, Agent, or Firm*—Donald F. Scherer

[57] ABSTRACT

A hydraulic control has valves for controlling the drive range selection and ratio interchange in a power transmission including a selector valve, a shift valve and a coast control valve. Each of these valves has a rotary spool distribution member for directing pressurized fluid to passages in a housing from which the fluid is delivered to the proper transmission mechanisms. The control simultaneously exhausts other transmission mechanisms.

6 Claims, 9 Drawing Sheets

5,378,207

TRANSMISSION CONTROL VALVE SYSTEM

TECHNICAL BACKGROUND

This invention relates to transmission control valves, and more particularly, to rotary control valves.

BACKGROUND OF THE INVENTION

Rotary valves for power transmissions have generally included a plurality of longitudinally stacked members, one or more of which are rotatable about the longitudinal axis, such as that shown in U.S. Pat. No. 4,603,603 issued to Salmon, Aug. 5, 1986. The stacked members are interconnected by worm tracks and through passages which are brought into communication with one or more pressure sources to permit the distribution of fluid to various components of the transmission. These rotary valves require relatively complex gaskets and seals to maintain proper separation of the various fluid channels.

SUMMARY OF THE INVENTION

It is an objection of this invention to provide an improved control valve mechanism for a power transmission having a compact rotary sleeve valve member.

It is another object of this invention to provide an improved rotary control valve arrangement for a power transmission, wherein the inlet and outlet pressures are longitudinally disposed relative to the rotary valve spools.

It is still another object of this invention to provide an improved control valve mechanism having three rotary control valves, wherein one control valve has a maximum of four operating positions and the remaining valves each having a maximum of three operating positions.

These and other objects and advantages will be more apparent from the following description and drawings.

DESCRIPTION OF AN EXEMPLARY EMBODIMENT

Figure 1:
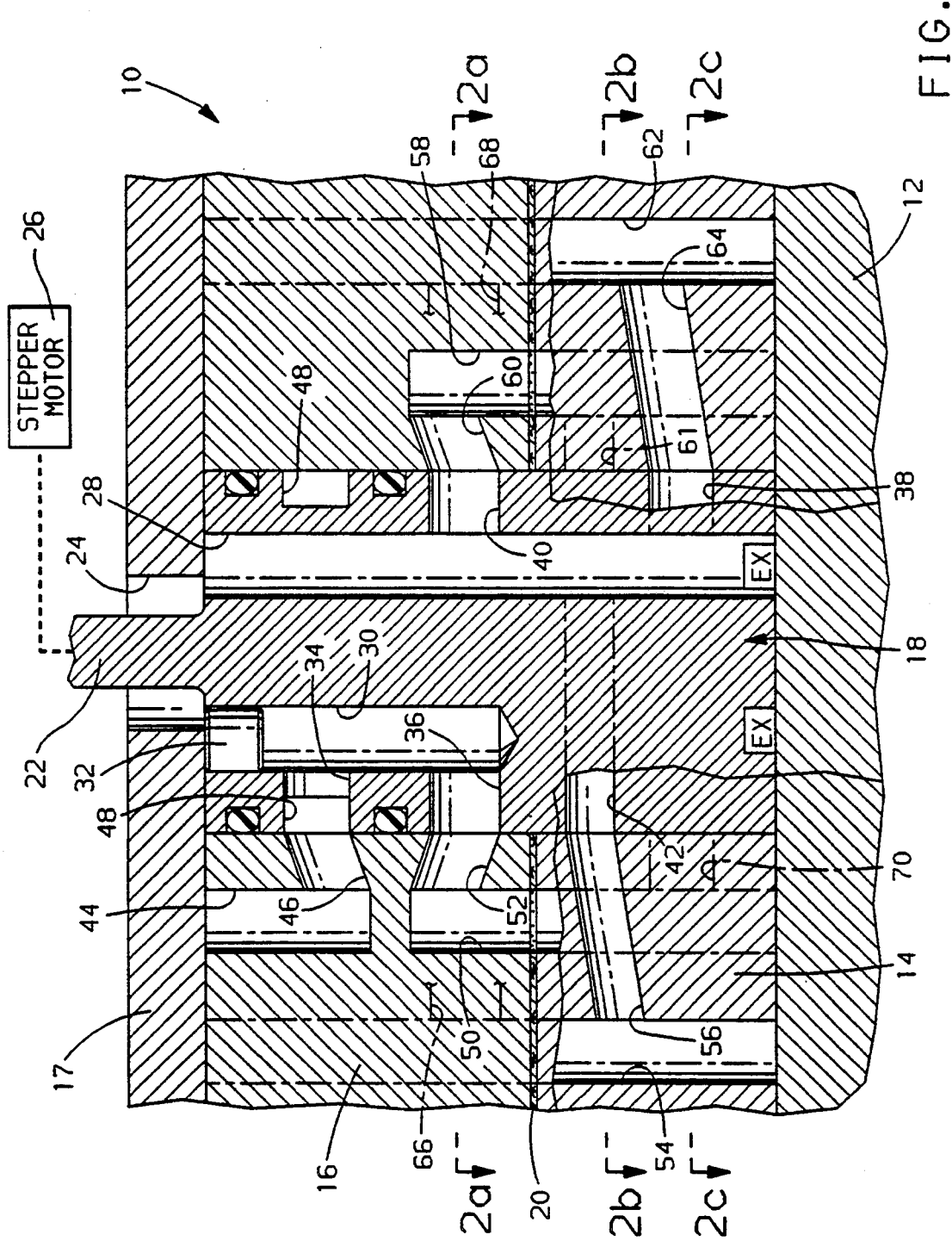
FIG. 1 is a sectional elevational view of a rotary valve incorporating the present invention.

Referring to the drawings, wherein like characters represent the same or corresponding parts throughout the several views, there is seen in FIG. 1 a rotary manual selector valve 10 comprised of a base 12, a lower housing 14, an upper housing 16, a cover 17 and a rotary valve spool 18. The upper housing 16 and lower housing 14 are separated by a gasket member 20.

The valve spool 18 is essentially cylindrical and incorporates a stem portion 22 which extends through an opening or aperture 24 formed in the cover 17. The stem portion 22 is drivingly connected to a conventional stepper motor 26 which is adapted to rotate the valve spool 18 in response to electrical signals provided at the stepper motor 26. The electrical signals provided at the stepper motor 26 can be generated or supplied by a conventional electronic control mechanism which utilizes a digital computer to determine the operating conditions requested by an operator or established by operating parameters of a vehicle.

The valve spool 18 includes a longitudinal exhaust passage 28 which extends the entire length of the valve spool 18 and is open for communication through the aperture 24 to permit draining to a transmission sump (not shown). The valve spool also includes a longitudinal pressure passage 30 which extends approximately half the length of the valve spool 18. The passage 30 is closed by a plug member 32 to prevent fluid communication between the passage 30 and the aperture 24.

A pair of radial or transverse passages 34 and 36 communicate the outer diameter of valve spool 18 with the passage 30. Three radial or transverse passages 38, 40 and 42 provide fluid communication between exhaust passage 28 and the outer diameter of the valve spool 18.

The upper housing 16 has formed therein a line pressure passage 44 which is provided with fluid communication from a conventional fluid pressure source, such as a pump and regulator valve, not shown. The passage 44 has a transverse extension 46 which is aligned with an annular groove 48 disposed for continuous fluid communication with the passage 34. Thus, the passage 30 is continuously pressurized fluid from the passage 44.

A Park-Reverse-Neutral (PRN) passage 50 is formed in the upper housing 16 and the lower housing 14. This passage 50 includes a transverse angled passage 52 which is disposed in fluid communication with the radial passage 36 when the spool valve 18 is in the position shown in FIG. 1 and FIG. 2. The PRN passage 50 is pressurized whenever the operator has selected the Park, Neutral or Reverse operation for the transmission.

A drive passage 54 is formed in the lower housing 14 and upper housing 16 and is in communication with a transverse passage 56 which is selectively connectible with the radial passage 42 of the valve spool 18. The fluid connection between passages 42 and 56 provides an exhaust connection the drive passage 54 to prevent pressurization of this passage whenever the spool valve 18 is in the position shown in FIG. 1, as represented by the schematic shown in FIG. 2b.

Figure 2A:
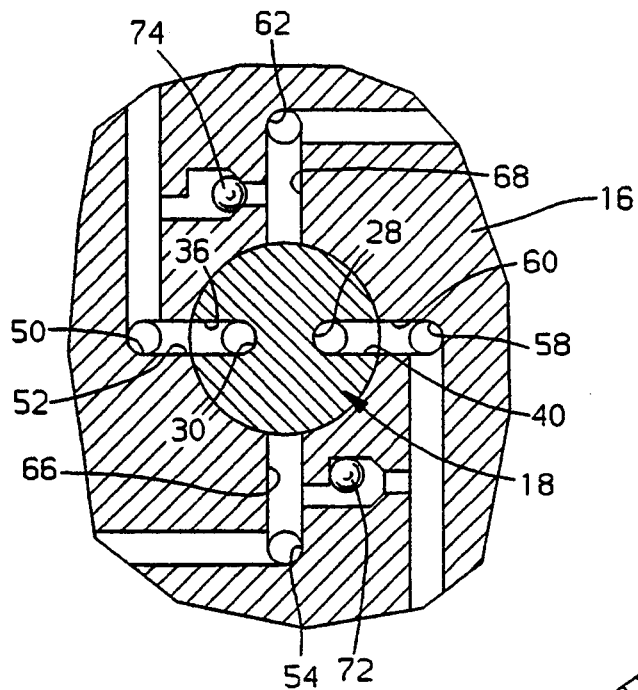
FIGS. 2a, 2b and 2c are schematic representations taken along the lines 2a—2a—, 2b—and 2c—2c, respectively, of the valve shown in FIG. 1 in one operating position.
Figure 2B:
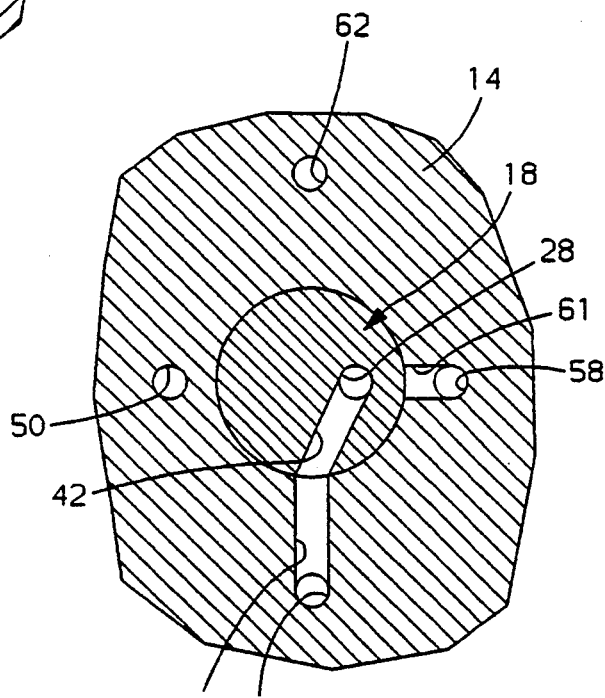
Figure 2C:
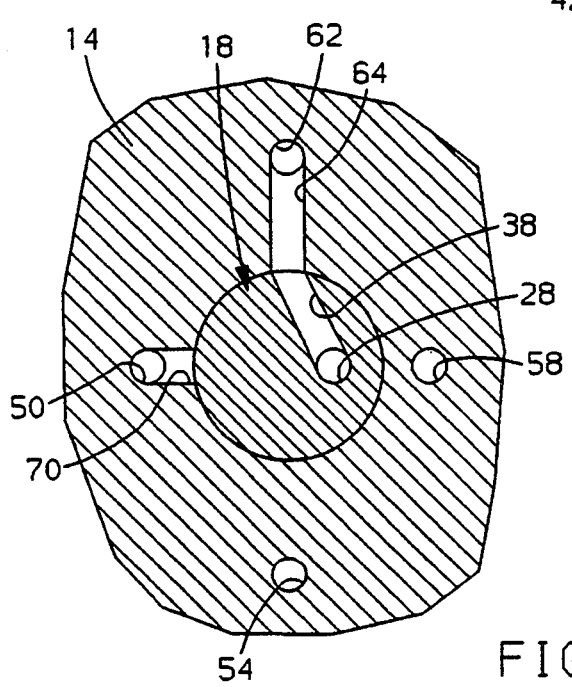
Figure 5A:
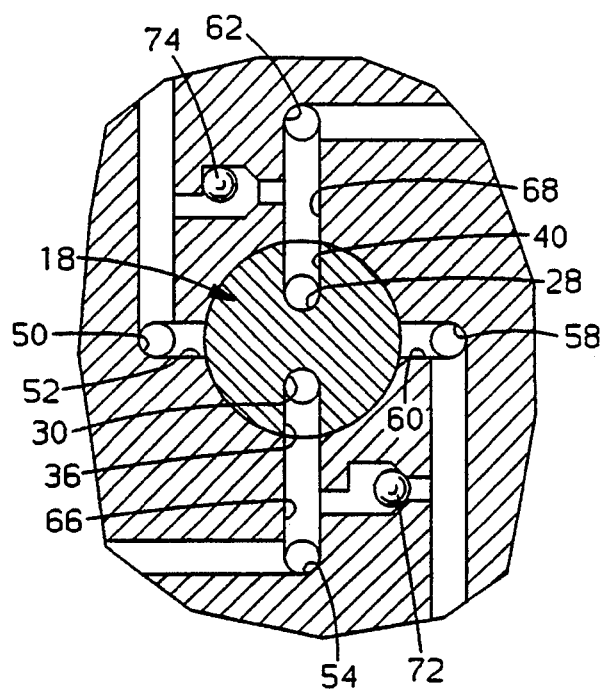
FIG. 5a, 5b and 5c are schematic representations similar to FIGS. 2a, 2b and 2c with the valve of FIG. 1 in still a further operating position.
Figure 5B:
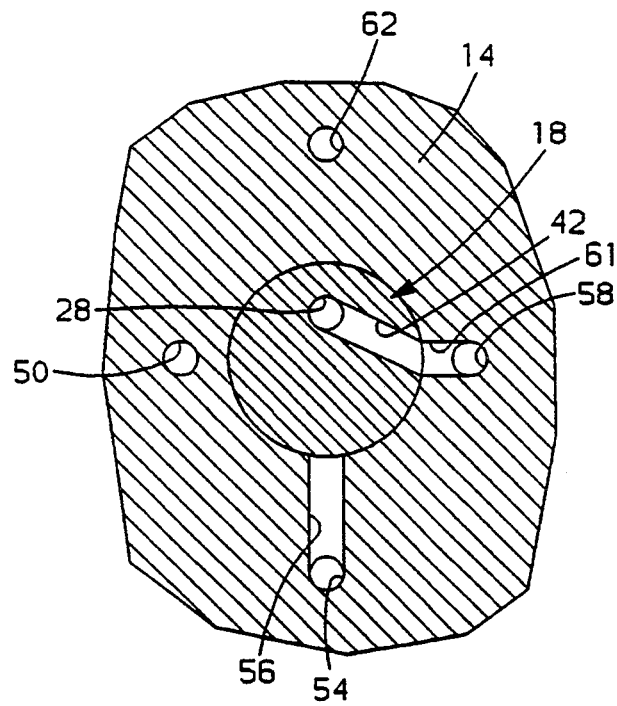

The upper housing 16 and lower housing 14 also have formed therein a coast passage 58 which is in fluid communication with the exhaust passage 28 through a transverse passage 60 disposed in fluid communication with the radial passage 40 whenever the valve spool 18 is in the position shown in FIG. 1, as depicted in FIG. 2a, and through a transverse passage 61 disposed in fluid communication with the passage 42 whenever the valve spool 18 is in the position depicted in FIG. 5b. The upper housing 16 and lower housing 14 also have formed therein a reverse passage 62 which is in fluid communication with a transverse passage 64 for providing fluid communication with the radial passage 38 and therefore exhaust passage 28 when the valve spool 18 is in the position shown in FIG. 1, as represented by FIG. 2c.

The upper housing 16 has two transverse passages 66 and 68 which are disposed in communication with passages 54 and 62, respectively. These passages 66 and 68 will permit selective communication between passage 36 and the passages 54 and 62, respectively.

A passage 70 is formed in the lower housing and is disposed in fluid communication with the passage 50 to provide selective communication between the passage 50 and the passage 38. This connection is made to provide an exhaust connection with the passage 50 when the control is disposed, as shown in FIG. 5.

Figure 4A:
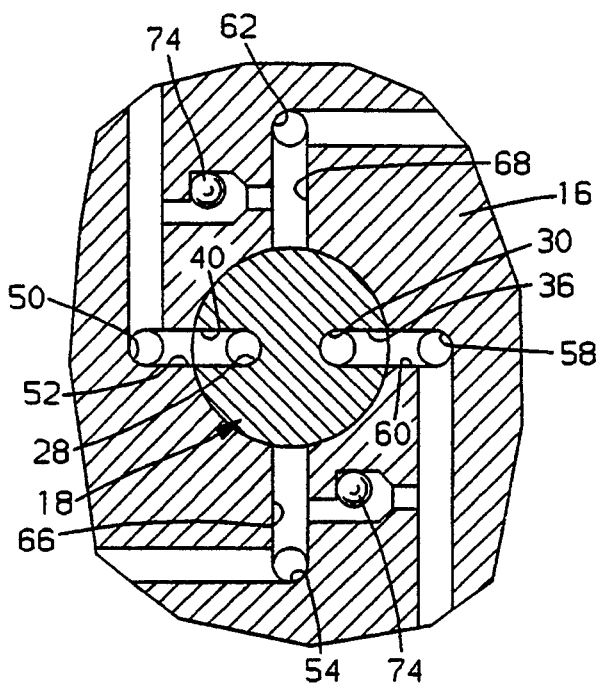
FIG. 4a, 4b and 4c are similar to FIGS. 2a, 2b and 2c with the valve of FIG. 1 in yet another operating position.

A pair of one-way valves or ball check valves 72, 74 are disposed in the upper housing 16. The check valve 72 permits free flow fluid communication from the passage 58 to the passage 54, but prevents reverse flow. The check valve 74 provides free fluid communication from the passage 62 to the passage 50, but prevents reverse flow. Thus, whenever the passage 58 is pressurized, as shown in FIG. 4a, the passage 54 will also be pressurized. Likewise, whenever the passage 62 is pressurized, the passage 50 will De pressurized, as shown in FIG. 4a.

Figure 3A:
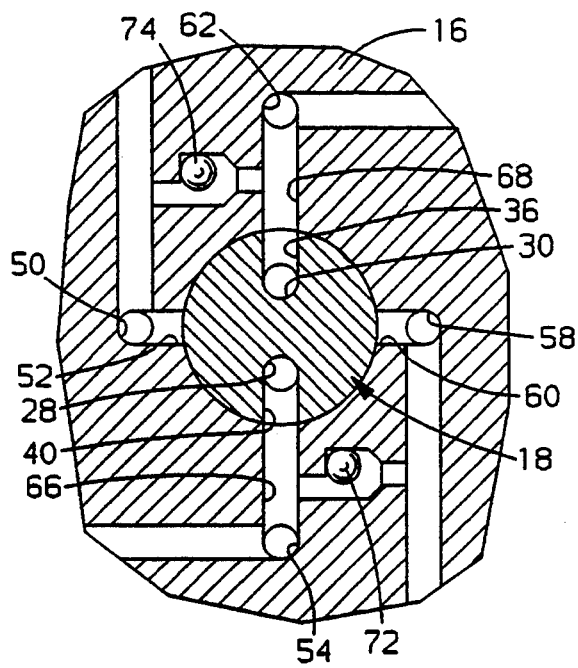
FIGS. 3a, 3b and 3c are similar to FIGS. 2a, 2b and 2c with the valve of FIG. 1 in another operating position.
Figure 3B:
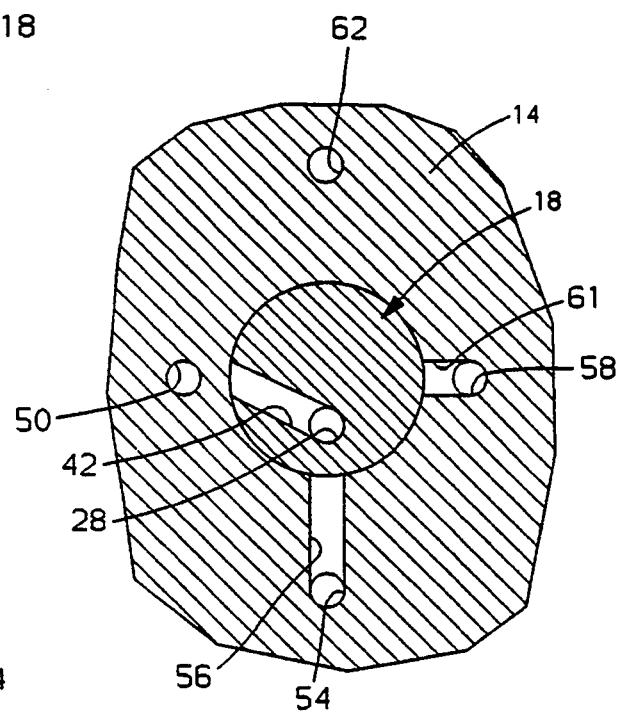
Figure 3C:
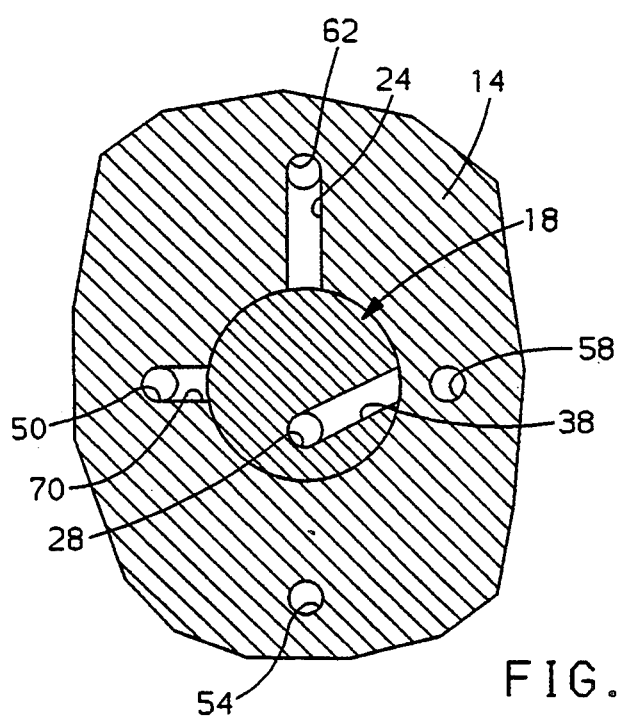
Figure 4B:
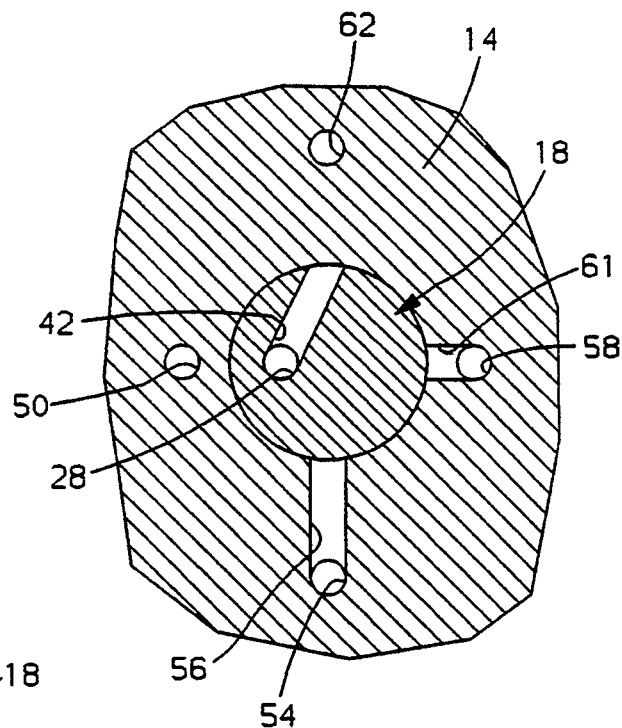
Figure 4C:
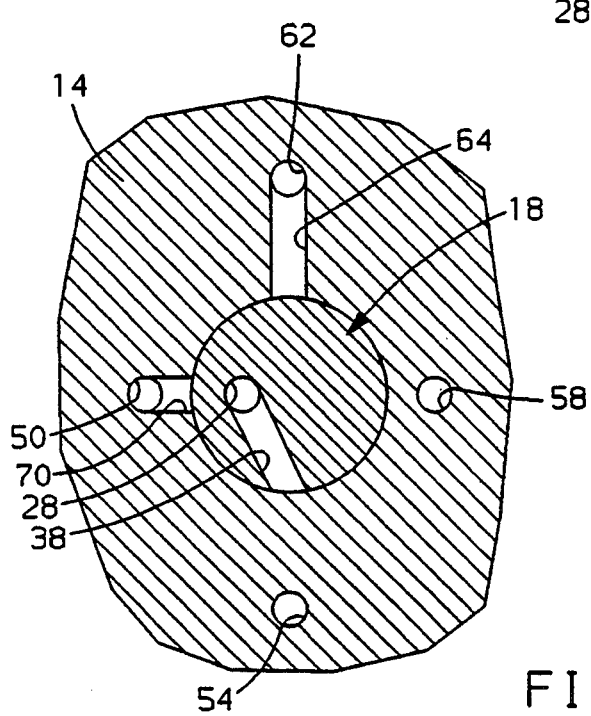
Figure 5C:
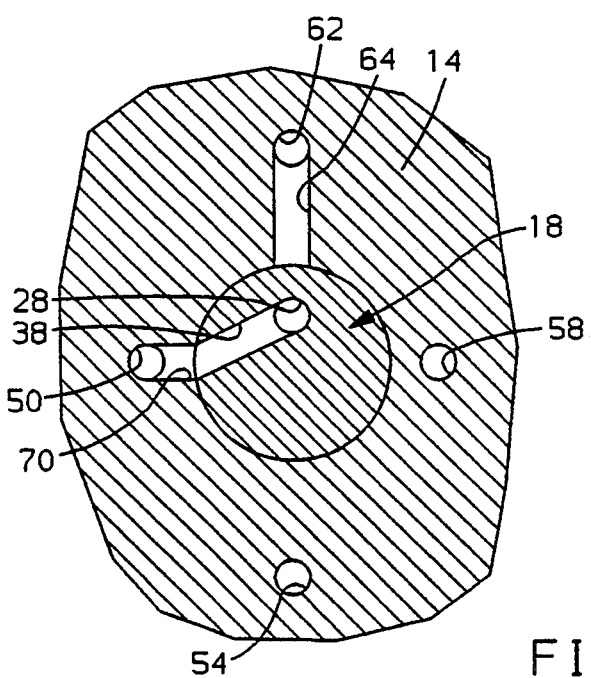

As described above, the valve spool 18 is provided with a conventional stepper motor 26 which will operate in a conventional manner to establish the operating positions of the valve spool 18. The selector valve 10, of which the valve spool 18 is a component, is the manual selector valve for a power transmission, not shown. The manual selector valve is positionable in a plurality of operating positions, such as Park or Neutral, as shown in FIGS. 2a, 2b and 2c; Reverse, shown in FIGS. 3a, 3b and 3c; Drive positions 1-3, which represent intermediate drive functions within the transmission, as shown in FIGS. 4a, 4b and 4c; and the highest Drive position, as shown in FIGS. 5a, 5b and 5c.

As is well known in power transmissions, whenever the manual selector is conditioned for Drive 1 through 3, which represent lower gear ratios, the power transmission will automatically upshift until the maximum selected Drive is reached. For example, if Drive 3 is selected, the power transmission will shift through first and second to reach the third ratio which would be held, whereas if Drive 2 is selected, the transmission will only shift first to second which would be held. In Drive 4, or the highest drive ratio, the transmission will shift through the first, second, third and fourth ratios. The shifting between these ratios, both up and down, is automatic.

The rotary valve 18 conditions the control system to distribute fluid pressure to the desirable fluid clutches and brakes which will cause the transmission to assume the drive condition selected by the operator. It is preferable that the valve system shown in FIGS. 1 through 5 is utilized with a power transmission which permits shifting from a one-way device during all upshifting and downshifting arrangements, thereby eliminating the need for overlap controls for the friction devices. However, with currently known electronic control features, the swapping of clutches and brakes is not a difficult matter, it merely complicates the transmission controls somewhat.

A transmission 73 (shown in FIG. 12) will permit the interchange of gear ratios or drive ratios by selectively energizing friction devices coupled with one-way drive establishing devices. This transmission is described in detail in U.S. Pat. No. 4,086,827 issued to Chana on Aug. 21, 1975. There are a number of other transmission gearing arrangements which permit similar shift function control.

Figure 6:
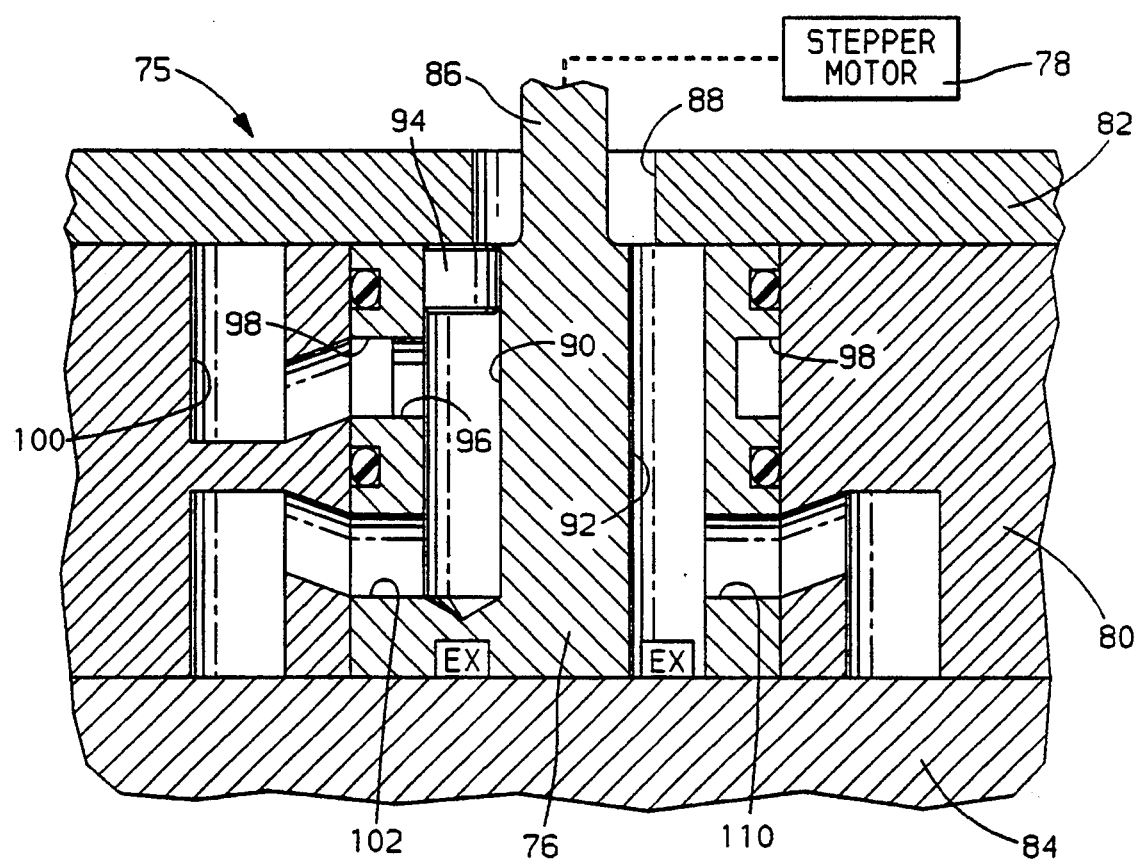
FIG. 6 is a cross-sectional elevational view of a shift valve incorporating the present invention.

FIG. 6 depicts a shift valve 75 which has a rotary valve spool 76 controlled by a conventional stepper motor 78 which responds to electrical signals to establish the rotary position of the valve Spool 76. The shift valve 75 further comprises a valve body 80 in which the valve spool 76 is rotatably disposed, and an upper and lower cover portions 82 and 84, respectively. A stem or drive member 86 extends from the valve spool 76 outward through an aperture 88 formed in cover 82 for engagement with the output of the stepper motor 78.

The valve spool 76 has a pair of longitudinal passages 90 and 92. The passage 92 is open at one end for fluid communication through the aperture 88 to permit exhausting thereof and therefore provides an exhaust passage for the shift valve 75. The passage 90 has a plug member 94 closing the passage 90 from the aperture 88. A radial passage 96 provides fluid communication between the passage 90 and an annular chamber 98 which, in turn, communicates with a drive passage 100.

The drive passage 100 is preferably in fluid communication with the passage 54 of the manual selector valve 10. Thus, whenever the drive passage 54 is pressurized, the passage 100 will be pressurized, and whenever the drive passage 54 is exhausted, the passage 100 will be exhausted.

The passage 90 also has a radial passage 102 which is selectively connectible with a plurality of clutch passages 104, 106 and 108. The passage 92 has a radial passage 110 communicating therewith which is selectively connectible with the clutch passages 104, 106 and 108.

Figure 7:
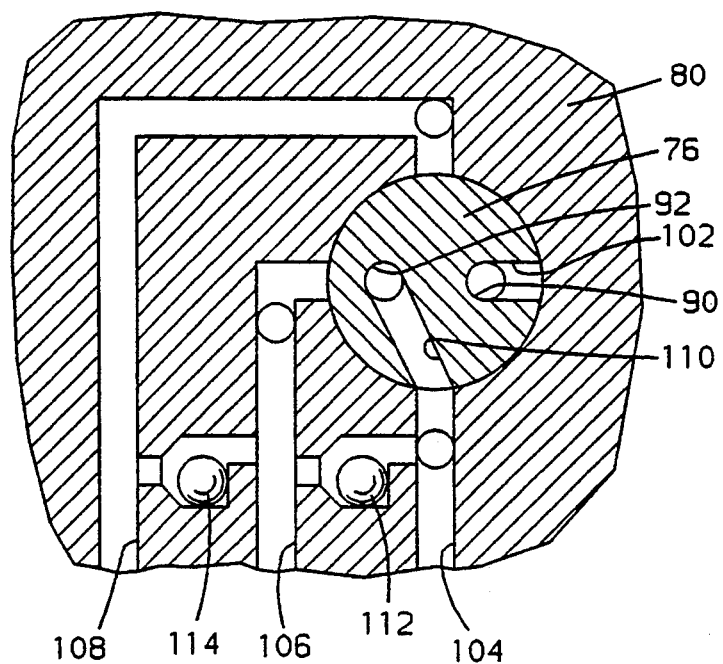
FIGS. 7, 8, 9 and 10 are schematic representations of the valve shown in FIG. 6 in various operating conditions.
Figure 10:
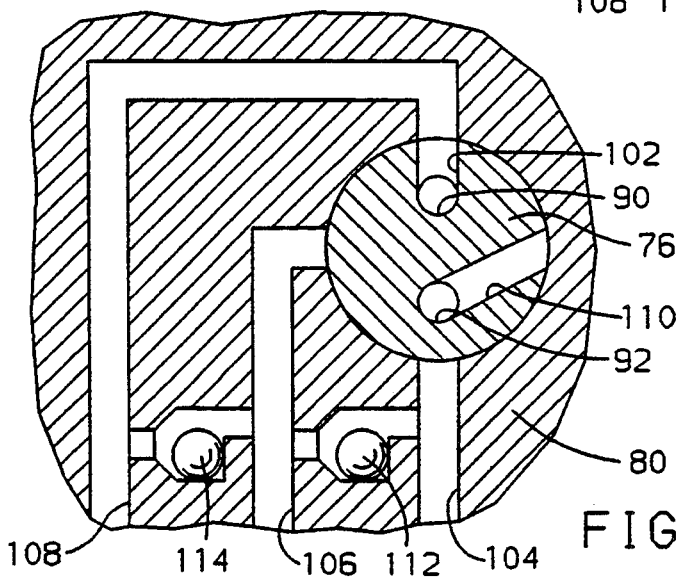

As seen in FIG. 7, which represents the first ratio of the transmission shift conditions, the passage 102, and therefore passage 90, can be disconnected from all of the clutch passages, and as seen in FIG. 10, the passage 110, and therefore passage 92, can be disconnected from all of the clutch passages.

In FIG. 7, the shift valve 75 is conditioned for the first or lowest ratio in the transmission. Fluid pressure in the passage 54 would be directed to a forward clutch member and also to the passage 100. The valve spool 75, being positioned as shown in FIG. 7, would permit the exhausting of the clutches 104, 106 and 108 thus conditioning the power transmission for the first or lowest ratio.

While the passages 104, 106 and 108 are described as clutch passages, this term should be considered as somewhat generic in that the passages can be connected to any torque establishing device, such as a friction clutch or a friction brake.

Figure 8:
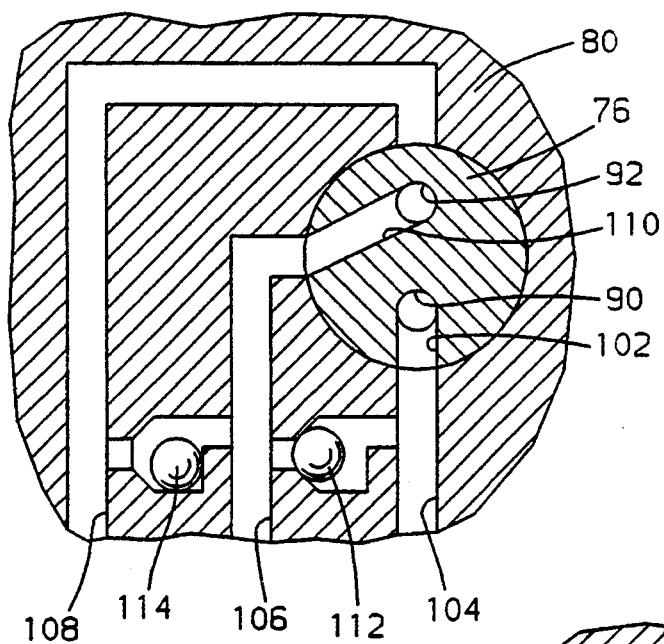

Whenever the operator selects D2 or if one of the automatic upshift selections has been made by the operator, the valve spool 76 will be moved to the second ratio position, as shown in FIG. 8. This upshift will be accomplished by the stepper motor 78 rotating valve spool 76 until the passage 102 is aligned with the passage 104 thereby energizing or activating the friction device connected therewith.

A plurality of check valves 112 and 114 are provided which permit free communication from passage 106 to 104 and from passage 108 to 106, respectively, while preventing reverse flow. As seen in FIG. 7, both check valves 114 and 116 are open permitting exhausting of the passages 108 and 106 through passage 104. However, on an upshift to second ratio, the passage 104 is pressurized thereby closing the check valve 112 to prevent pressurization of passage 106. Passage 108 remains exhausted through the check valve 114 via the passage 110 which is aligned with the passage 106.

Figure 9:
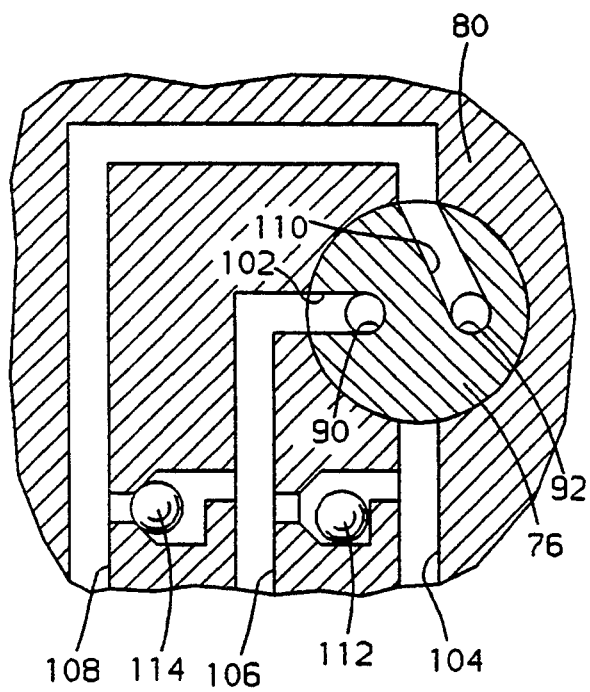

Further upshifting of the shift valve 75 from second gear to third gear results in the control mechanism attaining the position shown in FIG. 9, wherein the passage 106 is connected with passage 102 for pressurization via passages 100, 96 and 90, thereby conditioning the transmission for the third forward ratio of operation. The check valve 112 will open permitting pressurization of passage 104 continue, such that should a downshift occur, all that will be necessary is the exhausting of passage This is the primary reason for utilizing one-way devices within the drive mechanism.

An exhaust passage for passage 104 could be provided, if desired, however, then a number of other control elements will be needed within the transmission system. Namely, accumulators and/or return valves will be required to assist for controlling the shift time on a ratio interchange.

To shift the transmission from the third ratio to the fourth ratio, as shown in FIG. 10, the valve spool 76 is rotated such that the passage 102 is in fluid communication with the passage 108. With the passage 108 pressurized, the check valves 114 and 112 will permit the downstream friction devices to remain engaged, thereby permitting a smooth downshift control to occur should that be necessary.

Since the transmission is utilizing one-way devices for normal transmission operation, it will from time-to-time be desirable to have the lower ratios remain engaged during coasting such that engine braking can be applied to the vehicle. To accomplish this, a coast valve 120 is provided.

Figure 11A:
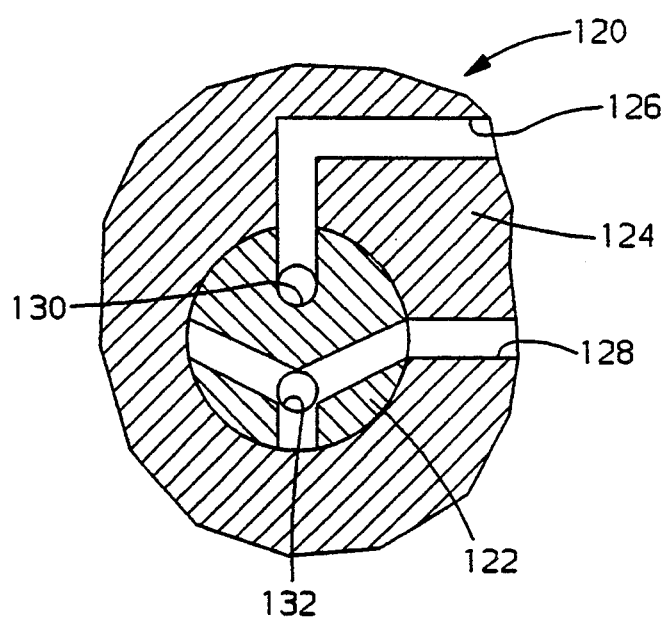
FIGS. 11a, 11b and 11c are schematic representations of a rotary coast valve in various operating conditions.
Figure 11B:
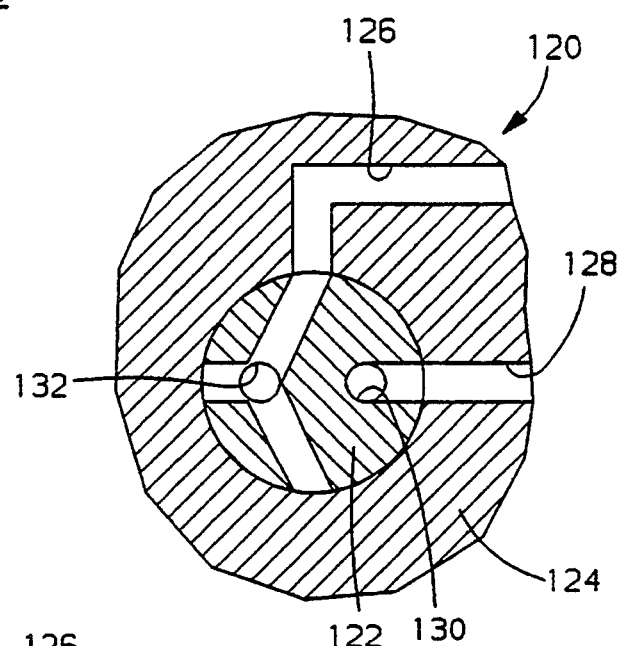
Figure 11C:
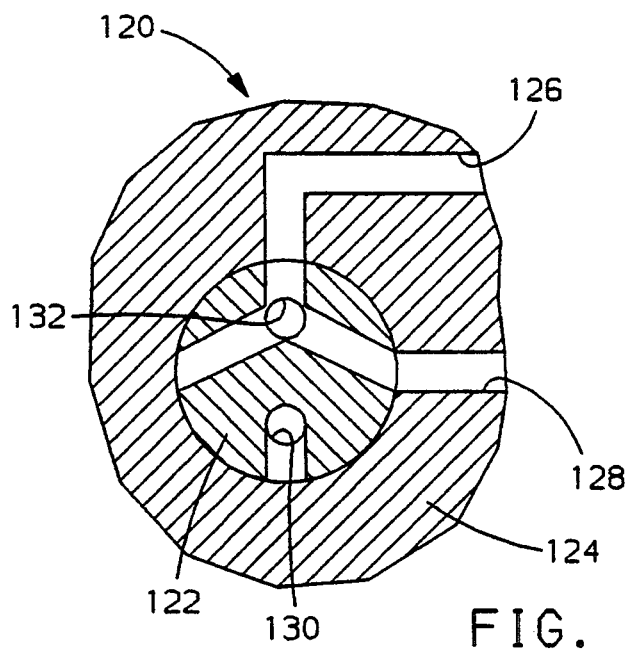
Figure 12:
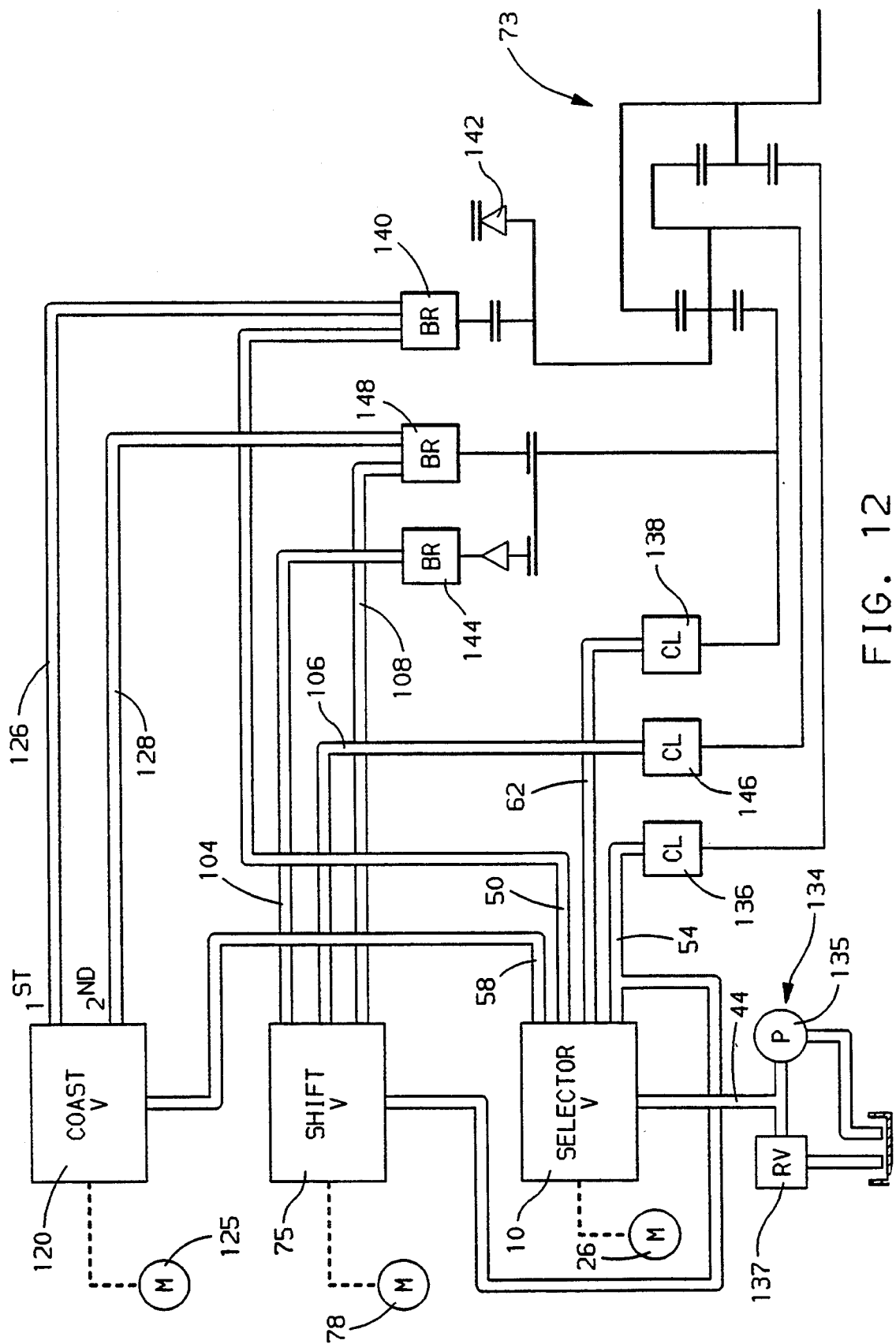
FIG. 12 is a schematic representation of the hydraulic control valving mechanism shown in FIGS. 1 through 11 and a planetary gear arrangement.

As seen in FIGS. 11a through 11c, the coast valve 120 has a spool 122 rotatably disposed in a housing 124. As seen in FIG. 12, a conventional stepper motor 125 is provided to control the position of spool 122. The housing 124 has formed therein a pair of friction device control passages 126 and 128 which control the first ratio and a second ratio drive establishing device, respectively.

As is well known in power transmissions utilizing one-way devices to permit easily timed upshifts and downshifts, a positive friction brake and/or clutch is also provided to ensure continuous torque transmission between the reaction member and the lower gear ratios and a transmission housing. The coast control valve 120 provides this function. The valve spool 122 has a supply passage 130 which is disposed in fluid communication with the passage 58 of the manual selector valve 10. Thus, whenever the passage 58 is pressurized, the passage 130 will be pressurized. The spool valve 122 also has an exhaust passage 132 which is selectively connectible with the passage 128, as shown in FIG. 11a, the passage 126, as shown in FIG. 11b, or both passages 126 and 128, as shown in FIG. 11c.

When the passage 132 is connected with the passages 126 and 128, the friction devices connected thereto will be inoperable and coast operation in that ratio, either first or second, will not be available. This is the condition shown in FIG. 11c, which would represent either third gear operation or fourth gear operation when the operator has not manually selected a coast braking condition. In FIG. 11b, the passage 130 is connected with the passage 128, such that coast braking in the second gear ratio will be provided.

From the foregoing description, it should be obvious that the three rotary valves provide a substantially complete manual and automatic shifting control system for a power transmission. Each of these control functions are provided through a simple rotary valve spool which is under the control of a conventional stepper motor, the operation of which is well known.

These rotary valve spools will provide a very compact and simple structure which is easily manufactured and readily repairable. A minimum of real estate within the transmission will be required to house these valve members, such that an economical assembly package is provided.

FIG. 12 is a schematic representation of the hydraulic control valving, a pressure source 134 and the transmission 73. The pressure source 134 is a conventional positive displacement pump 135 and regulator valve 137 which supplies pressurized fluid to the line pressure passage 44. The transmission 73 will provide four forward speeds and a reverse speed. To provide these speeds, various clutches and brakes are controlled by the selector valve 10, shift valve 75 and coast valve 120.

The selector valve 10 directly controls a forward clutch 136, a reverse clutch 138 and a low reverse brake 140. In reverse gear, the clutch 138 and brake 140 will be engaged to provide a reverse drive between the transmission input and output.

In all forward ranges, the passage 54 is pressurized, such that the clutch 136 will be pressurized. The clutch 136 is constructed to have both a one-way clutch and a friction clutch in series, as well as a friction bypassing clutch which will bypass the one-way portion. Such clutch structures are well known.

The first gear in the transmission is established by engaging the clutch 136 while a conventional one-way brake 142 will automatically engage thereby establishing the low or first drive ratio within the transmission 73.

The second drive ratio is established by arrangement the shift valve through its stepper motor 78 to cause passage 104 to be pressurized. Passage 104 is connected to engage a friction brake 144 which is connected in series with a conventional one-way device to establish the second ratio within the transmission. When the brake 144 is engaged, the one-way brake 142 will overrun.

The shift valve 75 will operate to pressurize passage 106 when the third gear ratio is selected to energize or pressurize a clutch 146, which along with clutch 136 will cause the transmission 73 to assume a direct drive or third ratio. The actuation of clutch 146 will produce a reverse torque at the brake 144, such that the overrunning portion of the brake 144 will release the gear device held thereby.

To establish the fourth forward drive ratio, the shift valve 75 is manipulated to pressurize passage 108 which will direct fluid pressure to a positive brake 148 which is operatively connected in parallel with the brake 144 to establish a reaction gear in the transmission 73, such that along with clutch 146, an overdrive ratio is produced within the transmission. Energization of brake 148 will impose a torque on the gear member connected to clutch 136, such that overrunning of the one-way portion of clutch 136 will occur.

The coast valve 120 is operable whenever the transmission is conditioned to operate in first or second gear and the driver wishes to have the engine permit or cause braking of the vehicle when the throttle is released. In first gear, the passage 126 is pressurized which results in pressurization of brake 140, which provides a positive ground connection for a member of the planetary transmission 73. The coast valve 120 pressurizes passage 128 when coast braking in second gear is desired. The passage 128 will pressurize the brake 148 to cause coast braking to occur when the throttle is released.

The embodiments of the invention in which an exclusive property or privilege is claimed are defined as follows:

1. A transmission control comprising:
 a rotary selector valve means having an elongated spool valve rotatably supported in a housing for selective rotary positioning therein;
 a pressure passage extending longitudinally in said spool;
 an exhaust passage extending longitudinally in said spool parallel with said pressure passage;
 said housing having formed therein a forward drive passage, a reverse drive passage, an intermediate drive passage and another drive passage;
 first valve means connected between said forward drive passage and said intermediate drive passage for permitting free fluid flow from said intermediate drive passage to said forward drive passage and preventing reverse fluid flow;
 second valve means for permitting free fluid flow from said reverse drive passage to said other drive passage and for preventing reverse flow therebetween;
 and transverse passage means for selectively connecting said pressure passage with each of said drive passages in said housing dependent upon the selective rotary positioning of the spool valve and for simultaneously connecting said exhaust passage to selective ones of the drive passages in said housing not connected with the pressure passage.

2. The transmission control defined in claim 1 further comprising:
 a plurality of selectively engageable clutch means and selectively engageable brake means for selectively establishing a first forward gear ratio, a second forward gear ratio, a third forward gear ratio and a fourth forward gear ratio;
 a shift valve means for selectively directing operating pressure to the plurality of clutch means and brake means;
 said shift valve including a rotary spool valve having a pair of spaced longitudinal passages in continuous fluid communication with the forward drive passage and an exhaust passage respectively, a valve body having a plurality of friction device control passages selectively connectible with said longitudinal passages at preselected rotary positions of said spool valve to selectively establish pressure signals and exhaust signals therein.

3. The transmission control defined in claim 2 wherein said friction device control passages are selectively controlled to engage the clutch means and brake means for respectively establishing the second, third and fourth forward gear ratios at the preselected rotary positions, and two of said friction device control passages which are selected for the second and third forward gear ratios are connected by a first one-way valve means to exhaust both said passages when the clutch means and brake means are selectively engaged to establish the first forward gear ratio.

4. The transmission control defined in claim 3 wherein the friction device control passages for the fourth and third forward gear ratios are interconnected by a second one-way valve means to exhaust both said passages when the first and second forward gear ratios are established.

5. The transmission control defined in claim 4 wherein the first and second one-way valve means cooperate to pressurize the friction device control passage for the second forward gear ratio when the friction device control passage for the third forward gear ratio is pressurized and simultaneously close the drive control passage for the third forward gear ratio from the friction device control passage for the fourth forward gear ratio.

6. The transmission control defined in claim 1 further comprising a coast control valve means having a rotary coast spool member selectively positionable for receiving fluid from said intermediate drive passage of said rotary selector valve means and for selectively distributing the fluid to one of the brake means for providing a low reaction at one selected position and to another of the brake means for providing a second ratio brake at another selected position to selectively establish a two-way drive upon the selection of the first forward gear ratio and second forward gear ratio by manipulating of the rotary selector valve means and the coast control valve means.

\* \* \* \* \*